L. ANDERSON.
VEHICLE WHEEL.
APPLICATION FILED MAR. 27, 1912.
1,058,518.
Patented Apr. 8, 1913.
3 SHEETS—SHEET 3.
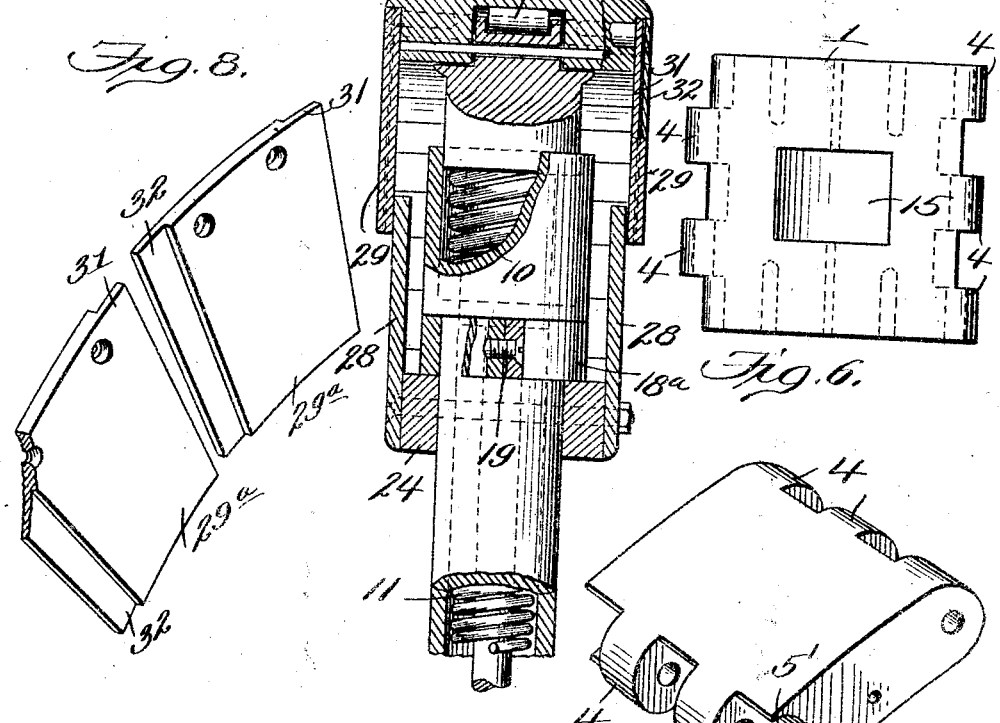
Witnesses:
Inventor
Lycurgus Anderson L. ANDERSON.
VEHICLE WHEEL.
APPLICATION FILED MAR. 27, 1912.
1,058,518.
Patented Apr. 8, 1913.
3 SHEETS—SHEET 3.
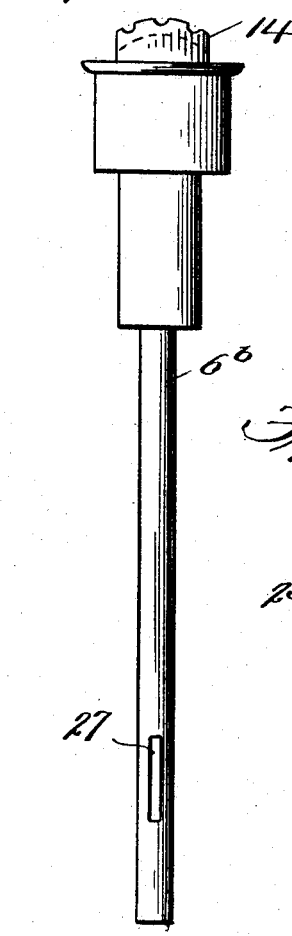
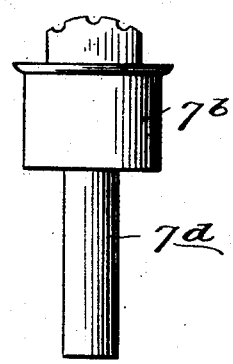
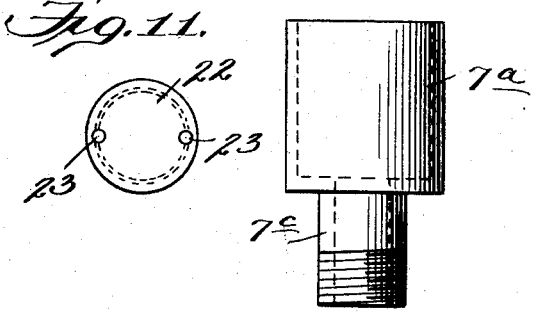
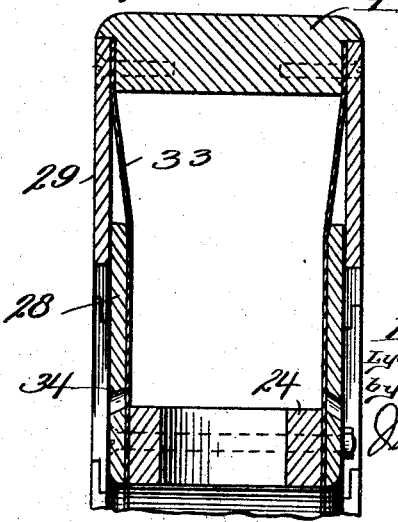

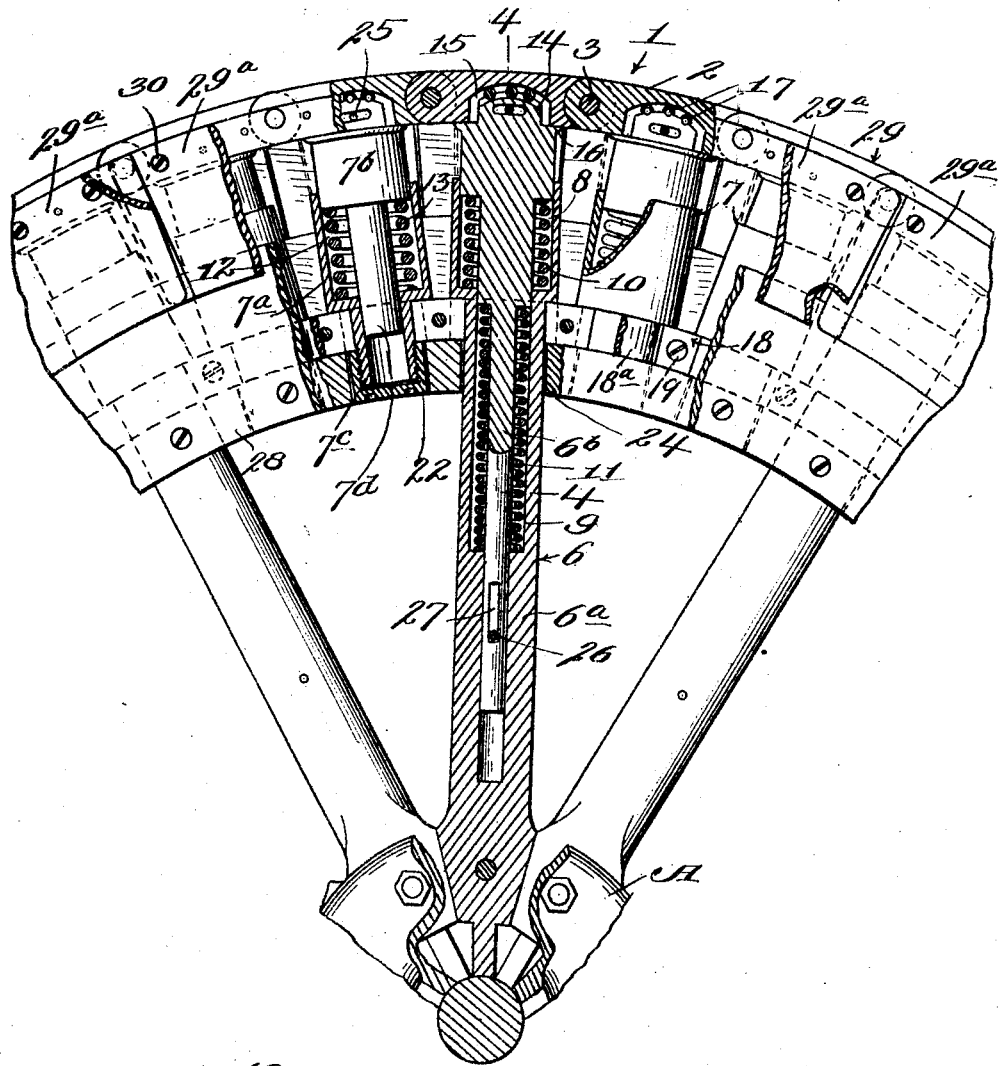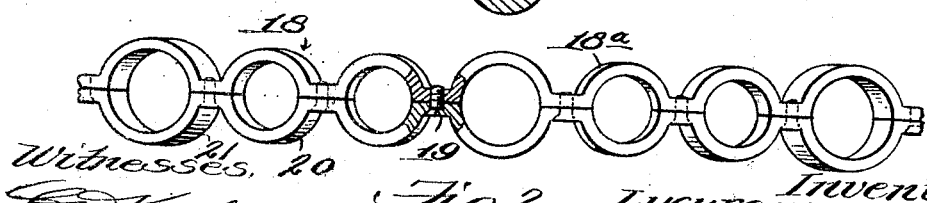

UNITED STATES PATENT OFFICE.

LYCURGUS ANDERSON, OF LAKE CREEK, TEXAS.

VEHICLE-WHEEL.

1,058,518.

Specification of Letters Patent.

Patented Apr. 8, 1913.

Application filed March 27, 1912. Serial No. 686,486.

*To all whom it may concern:*

Be it known that I, LYCURGUS ANDERSON, a citizen of the United States, residing at Lake Creek, in the county of Delta and State of Texas, have invented new and useful Improvements in Vehicle-Wheels, of which the following is a specification.

This invention relates to improvements in vehicle wheels of that general type which embodies a flexible tread and radially arranged springs for absorbing shocks and cushioning the yielding action of the parts of the said tread.

One object of the invention is to provide a wheel of the type stated, in which the operating parts are readily accessible for the purposes of renewal, cleaning, or repair.

A further object of the invention is to provide a yieldable tread or rim in which efficient provision is made against undue wear, occasioned by dust or gravel accumulating at the hinged joints of the sections of the tread.

A further object of the invention is to provide as a part of the cushioning means a wheel spoke made in telescopically related sections, of such construction that the greatest efficiency of spring action is obtained.

A further object of the invention is to provide an improved flexible side flange construction which efficiently serves to protect the inclosed working parts against dust or moisture.

An embodiment of the invention is disclosed in the accompanying drawings, wherein:

Figure 1 is a fragmentary view of a wheel, partly in side elevation, and partly in longitudinal section, showing the features of the present invention; Fig. 2 is a plan view of a two-part clamping ring by which the cushioning parts of the device are held in relation to the flexible tread; Fig. 3 is a detail plan view, partly in section, showing one of the elements of the flexible tread and the relation thereof to the adjoining elements; Fig. 4 is a detail cross sectional view on the line 4—4 of Fig. 1; Fig. 5 is a detail view showing anti-friction rollers provided at the outer ends of the spring-pressed spokes; Fig. 6 is a detail plan view of one of the elements of the flexible tread, looking at the inner face thereof; Fig. 7 is a detail perspective view of one of the elements of the flexible tread; Fig. 8 is a perspective view showing the construction and relation of the parts which make up the flexible side flanges; Fig. 9 is a detail elevation, with the parts in detached relation, of a main spoke; Fig. 10 is a similar view of an auxiliary spoke; Fig. 11 is a detail view of a retaining cap for one of the members of the auxiliary spoke; and Fig. 12 is a detail cross sectional view showing a modification of the side flange construction.

Similar characters of reference designate corresponding parts throughout the several views.

The improved wheel comprehends a flexible tread, designated generally by the numeral 1, and made up of hingedly connected tread blocks 2, shown in detail in Figs. 3, 6, and 7. The blocks 2 are of similar construction, and the hinged connections between the same comprise transverse pins 3 and interfitting knuckles 4, through which the pins 3 pass. The knuckles 4 are of approximately semicircular contour, and the blocks 2 have their faces between said knuckles of approximately semi-circular concave curvature, as at 5, to conformably receive the knuckles of the adjacent blocks, and at the same time to define tapering lips 6 which overlie the knuckles that work in the recesses 5 and efficiently prevent the passage of dust to the inclosed space occupied by the working parts.

The blocks 2 are individually yieldable, and their yielding movements are suitably cushioned. The cushioning means comprises a plurality of spokes made in telescopically related sections, and in the embodiment shown, includes the main spokes 6 and the auxiliary spokes 7. The telescoping sections of the spokes 6 are shown at 6$^a$ and 6$^b$, the section 6$^a$ being fixed in the hub A of the wheel, and the section 6$^b$ being axially movable in, and with relation to, the section 6$^a$. The fixed section 6$^a$ has a stepped bore, the divisions of which progressively increase in diameter toward the outer end of the section, and the movable section 6$^b$ is correspondingly stepped, its stepped divisions progressively decreasing in diameter toward its inner end. When the sections 6$^a$ and 6$^b$ are fitted together, their stepped construction provides a pair of annular chambers 8 and 9, the ends of which are defined by the shoulders of said sections. Said chambers inclose expansive coil springs 10 and 11, the ends of which bear against said shoulders. The spring 10 is located adjacent the outer end of the spoke 6 and the spring 11 is located inwardly of the spring 10. The office of these springs is to resist the inward movement of the section $6^b$, and thus to cushion the yielding action of the particular tread block 2 with which said section $6^b$ may be associated. The force of the inward movement of the section $6^b$ is obviously taken up first, and partly by the spring 10 and partly by the spring 11, the latter being of greater strength than the spring 10.

The sections of the auxiliary spokes 7 are shown at $7^a$ and $7^b$, the section $7^a$ being fixed and the section $7^b$ being axially movable in the section $7^a$. The section $7^a$ includes a reduced axial extension $7^c$ and the section $7^b$ includes a reduced axial extension $7^d$ which works in the extension $7^c$. When the sections $7^a$ and $7^b$ are in operative relation, an annular chamber 12 is defined, in which is inclosed an expansive coil spring 13, the ends of which bear against the shoulders afforded by the provision of the extensions $7^c$ and $7^d$. The office of the spring 13 is to cushion the inward yielding movements of the section $7^b$.

The spokes 6 and 7 in the aggregate correspond in number to the number of blocks 2, and by preference, a pair of spokes 7 is arranged between each pair of adjoining spokes 6. Each of the spokes 6 and 7 is associated with a corresponding block 2, preferably in the manner shown in the drawings, i. e. by the provision of extensions 14 on the outer ends of the respective spoke sections $6^b$ and $7^b$, and recesses 15 in the inner faces of the blocks 2 to receive said extensions, the recesses being of sufficient longitudinal extent to allow of some degree of longitudinal play between the blocks and the spokes. The sections $6^b$ and $7^b$ are also preferably provided with flanges or shoulders 16, each bearing against the inner faces of the blocks 2. The extensions 14 are preferably constructed to carry anti-friction rollers 17 which work in the recesses 15 and allow of easy movements between the blocks 2 and the spokes.

The fixed sections $7^a$ of the spokes 7 are securely held in position, and against any loose play, by a two-part clamping ring 18, (Fig. 2) composed of a pair of annular members $18^a$, secured together by screws 19 and each having, at intervals corresponding to the intervals of the spokes 6 and 7, semi-annular bends 20 and 21, which register in the combined relation of the members $18^a$ and define clamping collars for engagement with the several spoke sections. The collars defined by the bends 20 for engagement with the spoke sections $7^a$ closely surround the extensions $7^c$, and constitute the main support for the spoke sections $7^a$; while the collars defined by the bends 21 surround the spoke sections $6^a$ adjacent the external shoulders of the latter, and act in connection with the hub A to hold said spoke sections $6^a$ against loose play. The screws 19 are preferably arranged between the several bends of the sections $18^a$, and serve to draw said sections together and to cause them to exert a clamping pressure upon those portions of the spoke sections $6^a$ and $7^a$ which are inclosed within the collars defined by the respective bends 20 and 21. The sections $7^a$ are further held in relation by retaining caps 22 which are threaded upon the projecting inner end portions of the extension $7^c$, and are of the same diameter as the clamping collars defined by the adjacent bends 20 which said caps abut. The caps 22 may be applied and removed in any convenient manner, for instance, by a spanner wrench, the jaws of which will engage in openings 23 in the end faces of said caps.

The clamping ring 18 is preferably employed in connection with a felly, or inner rim 24, said ring 18 resting upon the rim 24 and the latter affording an annular base for the clamping ring and for the spokes 7. The felly 24 is provided with openings to accommodate the caps 22, but is otherwise imperforate, and aside from forming a base for the parts 18 and 7, serves in connection with side flanges to be hereafter described, to prevent the access of dust or moisture to the spokes 7, and the outer portions of the spokes 6.

It is preferred to connect the spoke sections $6^b$ and $7^b$ to the respective blocks 2 with which they are associated, as by transverse pins 25 which pass through slots in the extensions 14 of said spoke sections. Similar pins 26 may be employed to connect the inner portions of the spoke sections $6^b$ and $6^a$, the pins 26 passing through longitudinal slots 27 in the sections $6^b$. The office of the pins 25 and 26 is to prevent any accidental dissociation of the spoke sections, due to unusually strong and sudden vibrations or shocks.

As a protection against dust and moisture, the spokes 7 and the outer portions of the spokes 6 are to be completely housed. For this purpose, the tread 1, the felly 24, and side flanges are employed. The side flanges are arranged in pairs at each side of the wheel, and the inner flanges 28 are secured to the felly 24 and may be integral throughout their extent, while the outer flanges 29 are secured to the tread 1, and are made in sections $29^a$ which correspond in number and arrangement to the tread blocks 2 and are severally secured to said tread blocks as by screws 30. The flange sections $29^a$ are cut away at their opposite ends and at relatively opposite sides thereof, so as to provide relatively thin marginal extensions 31 and 32, the extension 31 of one flange section overlying the extension 32 of an adjacent flange section. The overlying relation of the extensions 31 and 32 is shown in Figs. 1 and 3, from which it will be apparent that each flange section 29ª has no positive connection with the flange sections at either side thereof, and is, consequently, movable with relation to the adjoining flange sections, at the same time coacting therewith by virtue of the extensions 31 and 32 to provide an efficient seal against the passage of dust or moisture. The flanges 29 also overlie the flanges 28, and coact with the latter in like manner in establishing a seal to prevent the passage of dust and moisture to the inclosed working parts.

It will be apparent that the tread 1, the felly 24, and the side flanges 28 and 29 form a complete housing for the spokes 7 and the outer portion of the spokes 6, and that, although this housing comprises yieldable or flexible walls, the passage of dust or moisture to the inclosed parts is efficiently prevented by the provision of the extensions 31 and 32 on the flange sections 29ª, and by the relation of the knuckles 4, the recesses 5, and the lips 6 of the hinged joints of the tread blocks 2. In case, however, any dust should work into the inclosed space defined by the tread 1, the felly 24, and the side flanges 28 and 29, its detrimental effect will be substantially prevented by the oil or grease in which the moving parts operate, and which will be contained in the chambers 8, 9, and 12 and in the recess 15. It may be noted that the shoulder 16 forms an efficient seal for the recess 15 and consequently prevents any dust from working into said recess and generating undue friction in the yielding action of the tread blocks 2 with relation to the spoke sections 6ᵇ and 7ᵇ.

In Fig. 12, a modified or alternative construction is shown, in which flexible linings 33 are associated with the side flanges 28 and 29, and the flanges 28 are provided above the felly 24 with apertures 34. The linings 33 are secured by screws or bolts which attach the flanges 28 and 29 to the felly 24 and to the tread 1, and are held between said flanges and said felly and tread respectively. In case any dust should work through the interstices between the flanges 28 and 29, or between the sections 29ª of the flanges 29, such dust will be prevented from passing to the inclosed space by the linings 33 and will ultimately pass out through the apertures 34.

The housing or casing provided by the tread or rim 1, the felly 24, and the flanges 28 and 29 not only protects the inclosed working parts, but it also conceals them, thus adding greatly to the appearance of the wheel and causing it to substantially resemble one of ordinary construction.

It is to be noted that the chambers 8, 9, and 12, in which the springs 10, 11, and 13 are contained, are of just sufficient width to enable free movements of said springs with relation to the adjacent portions of the spoke sections, but are not of sufficient width to allow of said springs being distorted under compression. Consequently, the springs are always maintained in proper relation, and a maximum efficiency of their action is secured. By filling or partially filling the chambers referred to with oil or grease, the relative movements of the spoke sections and of the springs are without substantial friction, and the efficient life of the springs is greatly prolonged.

While the operating parts are fully inclosed and protected, as above explained, they are, at the same time, readily accessible. For this purpose, any one of the tread blocks 2 may be removed by simply taking out the hinge joints 3. The spokes 7 are also individually removable by loosening the connections 19 adjacent thereto and by removing the cap 22. In case it is desirable, the spokes 7 may be removed in a unitary manner by disconnecting the sections 18ª of the clamping ring 18, and access to said clamping ring for the purpose of disconnecting said sections may be readily had by simply removing one of the side flanges 28, e. g. that side flange which is adjacent the heads of the screws 19.

Aside from the above advantages, the wheel is particularly efficient in action, since the relation of the spokes to the tread members 2 allows of the requisite freedom of individual movement of said tread members, and at the same time provides for an instant return of the tread members to their normal relation as soon as they have left the surface of the ground. As stated above, the movements of the tread members and of the movable parts of the spokes are without substantial friction, by reason of the lubricant which is contained in the spring chambers and in the recesses 15 of the blocks 2.

Having fully described my invention, I claim:

1. A vehicle wheel comprising a flexible tread made up of hingedly connected tread blocks, means for cushioning the individual yielding action of the tread blocks and for holding said blocks in normal relation, the means comprising spokes made in telescoping sections, and springs acting on the outer sections of the spokes to move them outwardly, the said movable spoke sections having extensions and shoulders adjacent thereto and the tread blocks having recesses to receive the extensions and bearing with their inner faces against the shoulders, and antifriction rollers arranged in the recesses and acting on the extensions.

2. A vehicle wheel comprising a flexible tread made up of hingedly connected tread blocks, means for cushioning the individual yielding action of the tread blocks and for holding said blocks in normal relation, the means comprising spokes made in telescoping sections and springs acting on the outer sections of the spokes to move them outwardly, the movable spoke sections having slotted extensions and the tread blocks having recesses to receive the extensions, antifriction rollers carried by the extensions, and transverse pins connecting the tread blocks and the movable sections of the spokes, the pins passing through the slots in the extension.

3. A vehicle wheel comprising a flexible tread made up of hingedly connected tread blocks, means for cushioning the individual yielding action of the tread blocks and for holding said blocks in normal relation, the means comprising spokes made in telescoping sections and springs acting on the outer sections of the spokes to move them outwardly and to hold them against the tread blocks, a clamping ring composed of two annular sections bolted together at intervals throughout their extent and formed with alining semi-circular bends which define clamping collars which surround and secure the inner sections of the spokes, and retaining caps of greater diameter than the openings of said clamping collars threaded upon the inner end portions of said inner sections and located adjacent the inner face of the clamping ring.

4. A vehicle wheel comprising a flexible tread made up of hingedly connected tread blocks, means for cushioning the individual yielding action of the tread blocks and for holding said blocks in normal relation, the means comprising spokes made in telescoping sections and springs acting on the outer sections of the spokes to move them outwardly and to hold them against the tread blocks, a clamping ring composed of two annular sections bolted together at intervals throughout their extent and formed with alining semi-circular bends which define clamping collars which surround and secure the inner sections of the spokes, retaining caps of greater diameter than the openings of said clamping collars threaded upon the inner end portions of said inner sections and located adjacent the inner face of the clamping ring, and an annular felly upon which the clamping ring rests and which is provided with openings to receive the retaining caps.

5. A vehicle wheel comprising a flexible tread made up of hingedly connected tread blocks, means for cushioning the individual yielding action of the tread blocks and for holding said blocks in normal relation, a felly located inwardly of the rim and concentric thereto, overlying side flanges at each side of the wheel, one of the side flanges being continuous and being secured to the felly, and the other side flange being formed of dissociated sections corresponding in number and arrangement to the tread blocks and severally secured to said tread blocks, the said flange sections having overlying marginal portions, and flexible linings arranged within said side flanges, one of the side flanges having apertures.

In testimony whereof I have hereunto set my hand in presence of two subscribing witnesses.

LYCURGUS ANDERSON.

Witnesses:
 CHARLES A. ROWE,
 C. Z. ANDERSON.